(12) United States Patent
Yang (10) Patent No.: US 7,869,130 B2
(45) Date of Patent: Jan. 11, 2011

(54) LINE BEAM ILLUMINATION OPTICAL SYSTEM

(75) Inventor: Haeng-Seok Yang, Bucheon-si (KR)

(73) Assignee: Samsung Electro-Mechanics Co., Ltd., Suwon (KR)

( * ) Notice: Subject to any disclaimer, the term of this patent is extended or adjusted under 35 U.S.C. 154(b) by 225 days.

(21) Appl. No.: 12/142,706

(22) Filed: Jun. 19, 2008

(65) Prior Publication Data

US 2009/0002837 A1    Jan. 1, 2009

(30) Foreign Application Priority Data

Jun. 22, 2007    (KR) ...................... 10-2007-0061826

(51) Int. Cl.
*G02B 27/30* (2006.01)
*G02B 3/00* (2006.01)

(52) U.S. Cl. ...................................... 359/641; 359/662

(58) Field of Classification Search ................. 351/641, 351/662; 359/641, 662
See application file for complete search history.

(56) References Cited

U.S. PATENT DOCUMENTS 6,104,541 A * 8/2000 Otomo ........................ 359/641
2002/0114082 A1    8/2002 Davydenko

FOREIGN PATENT DOCUMENTS

JP    2000-223541 A    8/2000

\* cited by examiner

*Primary Examiner*—Scott J Sugarman
(74) *Attorney, Agent, or Firm*—Christensen O'Connor Johnson Kindness PLLC (57) ABSTRACT

A line beam illustration optical system is disclosed. In accordance with an embodiment of the present invention, the line beam illustration optical system can include a first lens, emitting a beam of light incident from a light source in a first direction; a second lens, converging the beam of light, emitted in the first direction, in a second direction that is vertical to the first direction; and a third lens, forming a line beam in parallel with respect to the first direction by collimating the beam of light converged in the second direction, in the first direction. With the present invention, the line beam illustration optical system can reduce the overall length of the illustration optical system.

2 Claims, 8 Drawing Sheets

LINE BEAM ILLUMINATION OPTICAL SYSTEM

CROSS-REFERENCE TO RELATED PATENT APPLICATIONS

This application claims the benefit of Korean Patent Application No. 10-2007-0061826, filed on Jun. 22, 2007, in the Korean Intellectual Property Office, the disclosure of which is incorporated herein in its entirety by reference.

BACKGROUND OF THE INVENTION

1. Field of the Invention

The present invention relates to a line beam generating apparatus, more specifically to a line beam illumination optical system.

2. Background Art

In the conventional art, a line beam can be made in various ways. For example, a truncation type enlarging a beam and truncating the beam into a beam having a higher uniformity than a predetermined value to use as a line beam, a flat-top type uniformalizing a beam by using an aspherical lens or a holographic optical element (HOE) or a diffractive optical element (DOE), a type dividing a beam into a plurality of beams by using adequately arranged optical fibers, a type arranging light sources one-dimensionally and a type of lens array such as a free electron laser (FEL).

The truncation type, however, has a difficulty in improving the uniformity and the efficiency at the same time due to having the trade-off, which refers to losing the efficiency in return for gaining the uniformity or losing the uniformity in return for gaining the efficiency. The flat-top type using the aspherical lens such as a Powell lens has the difficult manufacture of lenses due to the necessity of acquiring a particular distance between each lens and the difficult use due to its sensitivity about the width of an incident beam or a collimation level.

The HOE or DOE has the lower manufacturing performance and efficiency. If emitted beams of light having different emission angles miss their designed paths, the uniformity is lowered. Also, the type using the optical fiber is not suitable for a line illumination having a small Etendue because the Etendue is increased after passing through the optical fiber. Here, the Etendue indicates the width of a light beam as an acquirable important property of a geometric optical system. The width of a light beam is determined by the plane size of a light source and the space angle of a light beam emitted from the light source. The type arranging light sources one-dimensionally and the type of lens array such as the FEL have the optical system more complex and its optical path more lengthened.

If a two-dimensional beam of light incident from a light source is converted to a one-dimensional beam of light in accordance with an embodiment of the present invention, the size (i.e. length) of the illumination optical system is lengthened.

SUMMARY OF THE INVENTION

The present invention provides a line beam illumination optical system that can reduce its overall length.

The present invention also provides a line beam illumination optical system that can optimize a line beam generating optical system by suitably arranging lenses according to the configuration of elements of a display system.

An aspect of the present invention features a line beam generating optical system including a first lens, emitting a beam of light incident from a light source in a first direction; a second lens, converging the beam of light, emitted in the first direction, in a second direction that is vertical to the first direction; and a third lens, forming a line beam in parallel with respect to the first direction by collimating the beam of light, converged in the second direction, in the first direction.

Another aspect of the present invention features a line beam generating optical system including a second lens, converging a beam of light incident from a light source in a second direction; a first lens, emitting the beam of light, converged in the second direction, in a first direction that is vertical to the second direction; and a third lens, forming a line beam in parallel with respect to the first direction by collimating the beam of light emitted in the first direction.

Here, an illumination-conversion angle of the second lens is determined by the following formula.

$$NA_x = \frac{D}{2I}$$

Here, $NA_x$ refers to the illumination-conversion angle. D refers to a second-directional width of the beam of light incident from the light source. I refers to a distance between the second lens and a converged point of the second direction.

BRIEF DESCRIPTION OF THE DRAWINGS

These and other features, aspects and advantages of the present invention will become better understood with regard to the following description, appended claims and accompanying drawings where:

DESCRIPTION OF THE EMBODIMENTS

Since there can be a variety of permutations and embodiments of the present invention, certain embodiments will be illustrated and described with reference to the accompanying drawings. This, however, is by no means to restrict the present invention to certain embodiments, and shall be construed as including all permutations, equivalents and substitutes covered by the spirit and scope of the present invention.

Terms such as "first" and "second" can be used in describing various elements, but the above elements shall not be restricted to the above terms. The above terms are used only to distinguish one element from the other. For instance, the first element can be named the second element, and vice versa, without departing the scope of claims of the present invention. The term "and/or" shall include the combination of a plurality of listed items or any of the plurality of listed items.

When one element is described as being "connected" or "accessed" to another element, it shall be construed as being connected or accessed to the other element directly but also as possibly having another element in between. On the other hand, if one element is described as being "directly connected" or "directly accessed" to another element, it shall be construed that there is no other element in between.

The terms used in the description are intended to describe certain embodiments only, and shall by no means restrict the present invention. Unless clearly used otherwise, expressions in the singular number include a plural meaning. In the present description, an expression such as "comprising" or "consisting of" is intended to designate a characteristic, a number, a step, an operation, an element, a part or combinations thereof, and shall not be construed to preclude any presence or possibility of one or more other characteristics, numbers, steps, operations, elements, parts or combinations thereof.

Unless otherwise defined, all terms, including technical terms and scientific terms, used herein have the same meaning as how they are generally understood by those of ordinary skill in the art to which the invention pertains. Any term that is defined in a general dictionary shall be construed to have the same meaning in the context of the relevant art, and, unless otherwise defined explicitly, shall not be interpreted to have an idealistic or excessively formalistic meaning.

Throughout the drawings, similar elements are given similar reference numerals. Throughout the description of the present invention, when describing a certain technology is determined to evade the point of the present invention, the pertinent detailed description will be omitted. Also, the embodiment of the present invention can be applied to a microelectromechanical system (MEMS) package typically for transmitting a signal to the outside or receiving a signal from the outside. Before the detailed description related to the embodiment of the present invention, a optical modulator and a display apparatus applied with the optical modulator, among the MEMS package applied to the present invention, will be firstly described.

Figure 1:
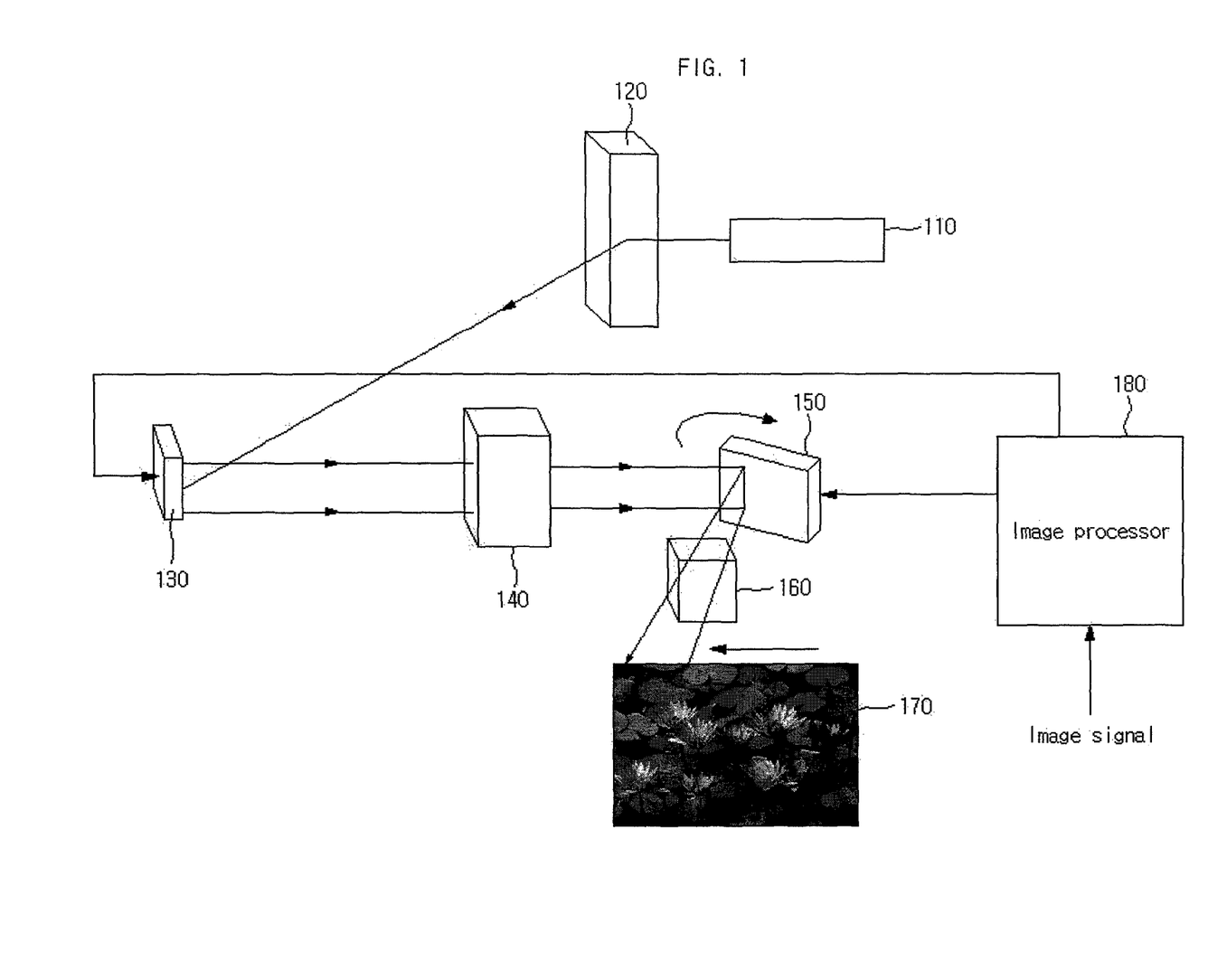
FIG. 1 illustrates a display apparatus using a line beam generating device in accordance with an embodiment of the present invention.

FIG. 1 illustrates a display apparatus using a line beam generating device in accordance with an embodiment of the present invention. The display apparatus can include a light source 110, a line beam illumination optical system 120, an optical modulator 130, a relay optical system 140, a scanning mirror 150, a projection optical system 160, a screen 170 and an image processor 180.

The light source 110 can generate a beam of light. Herein, the light source 110 can employ a light emitting diode (LED), a laser diode (LD) or a laser. The below description assumes that the light source 110 employs the LD, for example.

A beam of light emitted by the light source 110 can have its type changed by the line beam illumination optical system 120 before being incident to the modulator 130. In accordance with an embodiment of the present invention, the line beam illumination optical system 120 can generate a line beam of light having the small volume.

The optical modulator 130 can generate a diffracted beam of light by modulating an incident beam of light according to an image control signal received from the image processor 180. Then, the diffracted beam can pass through the relay optical system 140 before being transferred to the scanning mirror 150. The scanning mirror 150 can be rotated at a predetermined angel according to a mirror control signal received from the image processor 180 and project the diffracted beam of light on the screen 170 by using projection optical system 160.

Here, the projection optical system 160 can enlarge and project the diffracted beam of light to display the enlarged beam on the screen 170.

Herein, the line beam illumination optical system can include a collimator lens and a cylinder lens. The collimator lens and the cylinder lens can convert an incident beam of light to a linear parallel beam of light. In particular, the collimator lens can convert a condensed multi-beam of light to a horizontally directional linear beam of light with an optical path and pass the horizontally directional linear beam through a polarization beam splitter, a $\lambda/4$ wave plate and an X-prism to allow the beam to be incident to the optical modulator 130. Herein, the collimator lens can employ a concave lens and a convex lens.

The concave lens can enlarge a linear beam of light incident from a cylinder lens to allow the enlarged linear beam to be incident to the convex lens. Here, the cylinder lens can convert the parallel beam of light to a horizontally directional linear beam of light and allow the linear beam of light to be incident to the pertinent optical modulator 130 through the collimator lens in order to allow a beam of light incident from a condensing unit to be horizontally incident to the corresponding optical modulator 130 placed horizontally with the direction of the optical path. In accordance with an embodiment of the present invention, the size of the line beam illumination optical system 120 can be changed by adjusting the order of allowing a beam of light to be diverged and to be converged.

Here, the spatial optical modulator is mainly divided into a direct type, which directly controls the on/off state of light, and an indirect type, which uses reflection and diffraction. The indirect type can be further divided into an electrostatic type and a piezoelectric type. Here, the optical modulator is applicable to the present invention regardless of the operation type.

An electrostatic type grating optical modulator includes a plurality of regularly spaced reflective ribbons having reflective surfaces and suspended above an upper part of the substrate, the spaced distances of the reflective ribbons being adjustable.

First, an insulation layer is deposited onto a silicon substrate, followed by depositions of a silicon dioxide film and a silicon nitride film. Here, the silicon nitride film is patterned with the ribbons, and some portions of the silicon dioxide film are etched such that the ribbons can be maintained by a nitride frame on an oxide spacer layer. The modulator is designed to allow the thickness of the ribbon and the thickness of the oxide spacer to be $\lambda 0/4$ in order to modulate a beam of light having a single wavelength of $\lambda 0$.

The grating amplitude, of the modulator limited to the vertical distance d between the reflective surfaces of the ribbons and the reflective surface of the substrate, is controlled by supplying a voltage between the ribbons (i.e. the reflective surface of the ribbon, which acts as a first electrode) and the substrate (i.e. the conductive film at the bottom portion of the substrate, which acts as a second electrode).

Figure 2A:
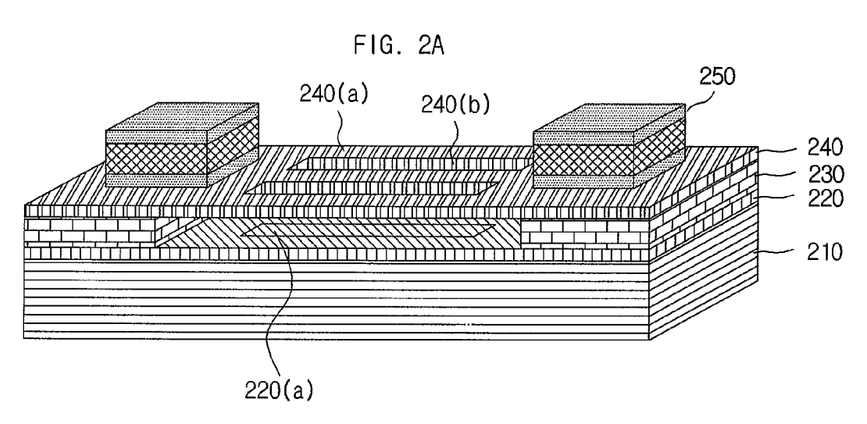
FIG. 2A is a perspective view showing a type of a diffractive optical modulator module using a piezoelectric element applicable to an embodiment of the present invention.
Figure 2B:
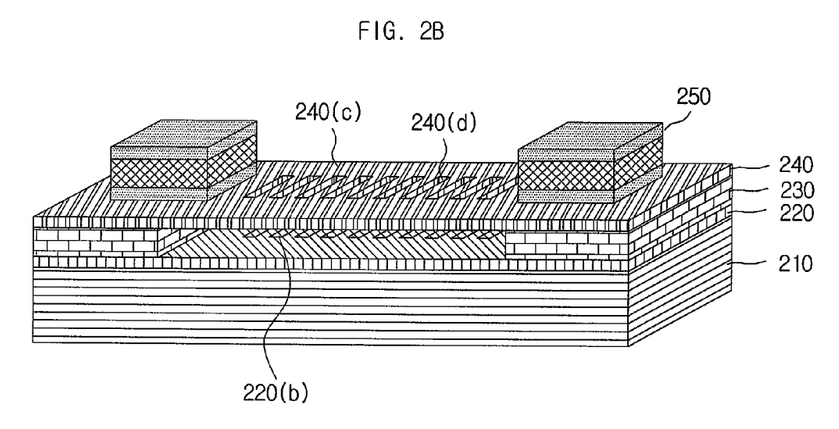
FIG. 2B is a perspective view showing another form of a diffractive optical modulator module using a piezoelectric element applicable to an embodiment of the present invention.

FIG. 2A is a perspective view showing a type of a diffractive optical modulator module using a piezoelectric element applicable to an embodiment of the present invention, and FIG. 2B is a perspective view showing another form of a diffractive optical modulator module using a piezoelectric element applicable to an embodiment of the present invention. Referring to FIG. 2A and FIG. 2B, the optical modulator including a substrate 210, an insulation layer 220, a sacrificial layer 230, a ribbon structure 240 and a piezoelectric elements 250 is illustrated.

The substrate 210 is a commonly used semiconductor substrate, and the insulation layer 220 is deposited as an etch stop layer. The insulation layer 220 is formed from a material with a high selectivity to the etchant (an etching gas or an etching solution) that etches the material used as the sacrificial layer 230. Here, a lower reflective layer 220(a) or 220(b) can be formed on the insulation layer 220 to reflect incident beams of light.

The sacrificial layer 230 supports the ribbon structure 240 at opposite sides such that the ribbon structure 240 can be spaced by a constant gap from the insulation layer 220, and forms a space in the center part.

The ribbon structure 240 creates diffraction and interference in the incident light to perform optical modulation of signals. The ribbon structure 240 can be formed in a plurality of ribbon shapes, or can include a plurality of open holes in the center portion of the ribbons according to the piezoelectric type. Also, the piezoelectric element 250 controls the ribbon structure 240 to move upwardly and downwardly according to upward and downward, or leftward and rightward contraction or expansion levels generated by the difference in voltage between the upper and lower electrodes. Here, the lower reflective layer 220(a) or 220(b) is formed in correspondence with the holes 240(b) or 240(d) formed in the ribbon structure 240.

For example, in case that the wavelength of a beam of light is $\lambda$, when there is no power supplied or when there is a predetermined amount of power supplied, the gap between an upper reflective layer 240(a) or 240(c), formed on the ribbon structure 240, and the insulation layer 220, formed with the lower reflective layer 220(a) or 220(b), is equal to $n\lambda/2$, n being a natural number. Accordingly, in the case of a $0^{th}$-order diffracted (reflected) beam of light, the overall path length difference between the light reflected by the upper reflective layer 240(a) or 240(c) formed on the ribbon structure 240 and the light reflected by the insulation layer 220 is equal to $n\lambda$, so that constructive interference occurs and the diffracted light renders its maximum luminance. In the case of the $\pm 1^{st}$ or $-1^{st}$ order diffracted light, however, the luminance of the light is at its minimum value due to destructive interference.

Also, when a predetermined amount of power, which is different from the supplied power mentioned above, is supplied to the piezoelectric elements 155, the gap between the upper reflective layer 240(a) or 240(c) formed on the ribbon structure 240 and the insulation layer 220, formed with the lower reflective layer 220(a) or 220(b), becomes $(2n+1)\lambda/4$, n being a natural number. Accordingly, in the case of a $0^{th}$-order diffracted (reflected) beam of light, the overall path length difference between the light reflected by the upper reflective layer 240(a) or 240(c) formed on the ribbon structure 240 and the light reflected by the insulation layer 220 is equal to $(2n+1)\lambda/2$, so that destructive interference occurs, and the diffracted light renders its minimum luminance. In the case of the $+1^{st}$ or $-1^{st}$ order diffracted light, however, the luminance of the light is at its maximum value due to constructive interference. As a result of such interference, the spatial optical modulator can load signals on the beams of light by adjusting the quantity of the reflected or diffracted light.

Although the foregoing describes the cases in which the gap between the ribbon structure 240 and the insulation layer 220 formed with the lower reflective layer 220(a) or 220(b), is $n\lambda/2$ or $(2n+1)\lambda/4$, it is obvious that a variety of embodiments, which are able to operate with a gap adjusting the intensity of interference by diffraction and reflection of the incident light, can be applied to the present invention.

The below description will focus on an optical modulator illustrated in FIG. 2A.

Figure 2C:
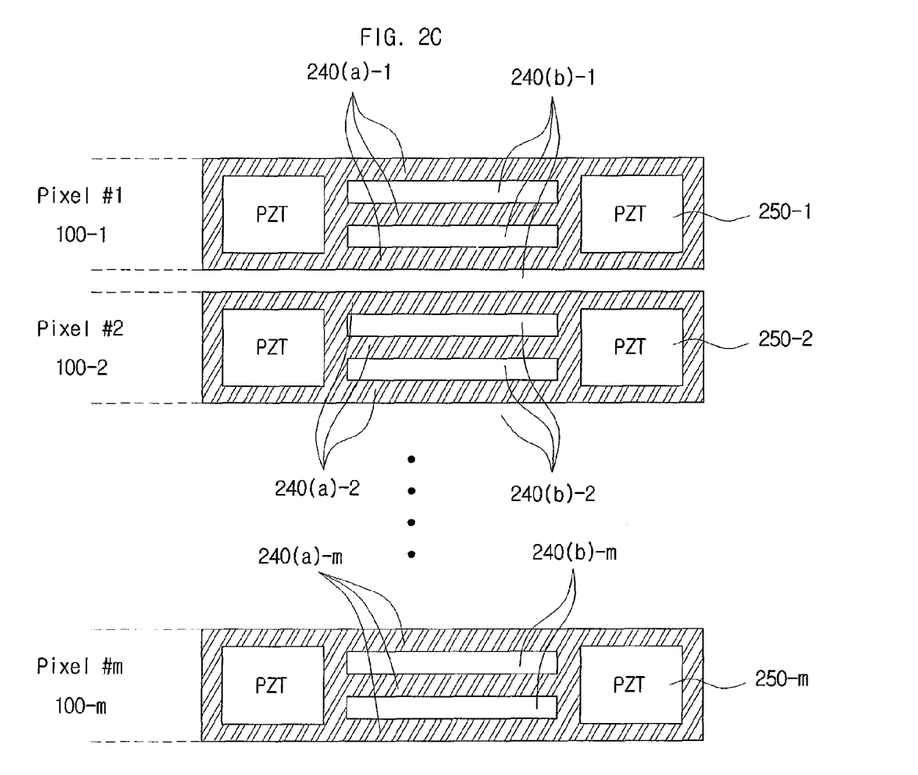
FIG. 2C is a plan view showing a diffractive optical modulator array applicable to an embodiment of the present invention.

Referring to FIG. 2C, the spatial optical modulator is configured to include m micro-mirrors 100-1, 100-2, . . . , and 100-m, each of which corresponds to a first pixel (pixel #1), a second pixel (pixel #2), . . . , and an $m^{th}$ pixel (pixel #m), respectively, m being a natural number. The spatial optical modulator deals with image information with respect to 1-dimensional images of vertical or horizontal scanning lines (which are assumed to consist of m pixels), while each micro-mirror 100 deals with one pixel among the m pixels constituting the vertical or horizontal scanning line. Thus, the light reflected or diffracted by each micro-mirror is later projected as a 2-dimensional image to a screen by an optical scanning device. For example, in the case of an image having a VGA resolution of 640*480, modulation is performed 640 times for one surface of the optical scanning device for 480 vertical pixels, to thereby generate 1 frame of display per surface of the optical scanning device. Here, the optical scanning device can be a polygon mirror, a rotating bar, or a Galvano mirror, for example.

Even though the description below of the principle of optical modulation concentrates on the first pixel (pixel #1), the same can obviously apply to other pixels.

In the present embodiment, it is assumed that the number of holes 240(b)-1 formed in the ribbon structure 240 is two. Because of the two holes 240(b)-1, there are three upper reflective layers 240(a)-1, operated by a piezoelectric element 155-1, formed on an upper part of the ribbon structure 240. On the insulation layer 220, two lower reflective layers are formed in correspondence with the two holes 240(b)-1. Also, there is another lower reflective layer formed on the insulation layer 220 in correspondence with the gap between the first pixel (pixel #1) and the second pixel (pixel #2). Accordingly, the number of the upper reflective layers 240 (a)-1 is identical to that of the lower reflective layers per pixel, and as discussed with reference to FIG. 1A, it is possible to control the luminance of the modulated light by using the $0^{th}$-order diffracted light or $\pm 1^{st}$-order diffracted light.

Figure 2D:
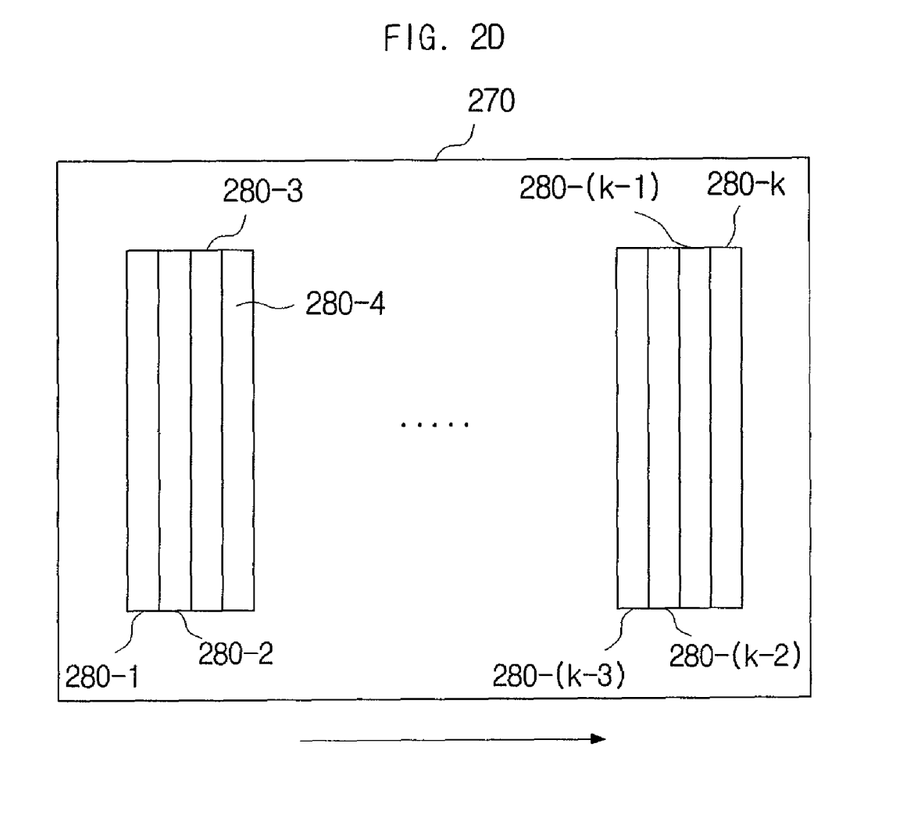
FIG. 2D is a schematic view showing a screen generated with an image by a diffractive optical modulator array applicable to an embodiment of the present invention.

FIG. 2D is a schematic view showing a screen generated with an image by a diffractive optical modulator array applicable to an embodiment of the present invention.

Lights reflected and/or diffracted by vertically arranged m micro-mirrors 100-1, 100-2, . . . , and 100-m are reflected by the optical scanning device and then scanned horizontally onto a screen 270, to thereby generate pictures 280-1, 280-2, 280-3, 280-4, . . . , 280-(k-3), 280-(k-2), 280-(k-1), and 280-k. One image frame can be projected in the case of one rotation of the optical scanning device. Here, although the scanning is performed from the left to the right (i.e. the arrow indicating the direction), it is apparent that images can be scanned in another direction (e.g. in the opposite direction).

The below description is related to a display apparatus to which the present invention is applied. Hereinafter, a detailed embodiment of a line beam illumination optical system in accordance with the present invention will be described. Naturally, the detailed embodiment is not limited to the present invention. The conventional line beam illumination optical system will be firstly described, and the line beam illumination optical system in accordance with an embodiment of the present invention will be secondly described.

Figure 3A:
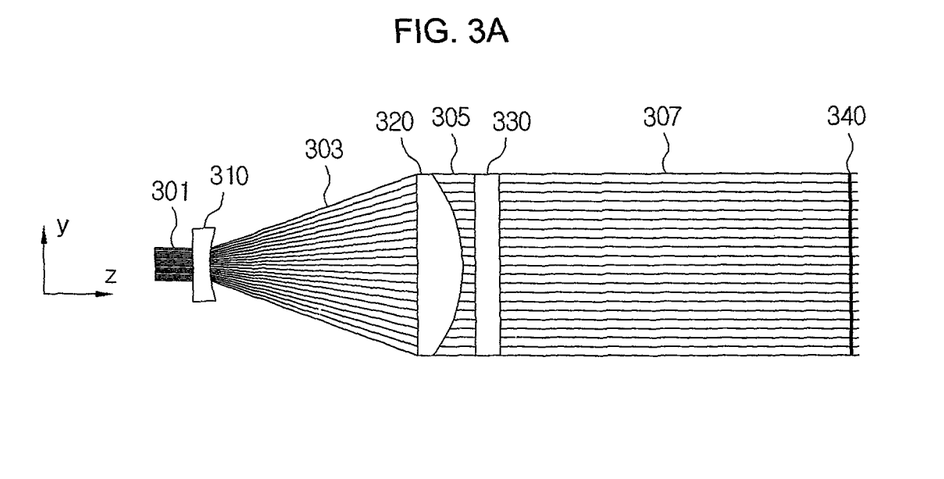
FIGS. 3A and 3B illustrate a line illumination method of a line beam illumination optical system in accordance with the conventional art.
Figure 3B:
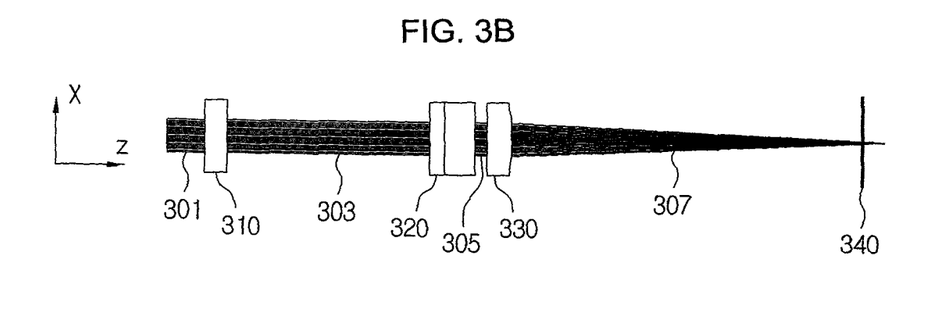

FIGS. 3A and 3B illustrate a line illumination method of a line beam illumination optical system in accordance with the conventional art. Referring to FIGS. 3A and 3B, an incident beam of light 301 emitted from a light source, a diffused beam of light 303, a parallel beam of light 305, a converged beam of light 307, a concave lens 310, a first cylinder lens 320, a second cylinder lens 330 and a converged point 340 are illustrated.

The incident beam of light 301 emitted from the light source can be diffused in a first direction (e.g. y-direction) by passing through the concave lens 310. The diffused beam 303 can be incident to the first cylinder lens 320. Then, the diffused beam 303 incident to the first cylinder lens 320 can be converted to the parallel beam 305 again by passing through the first cylinder lens 320. The parallel beam can pass through the second cylinder lens 330 before being converged in a second direction (e.g. x-direction) vertically with the first direction to reach in order to reach to the converged point 340.

Here, the overall length L of the illumination optical system is identical to or larger than a value evaluated by adding the distance between the second cylinder lens 330 and the converged point 340 into the distance between the concave lens 310 and the first cylinder lens 320.

As such, in accordance with the conventional art, reducing the overall length L of the illumination optical system has its limit because the line beam is generated by forming the parallel beam 305 with respect to the first direction and then by converging the formed parallel beam 305 in a second direction.

Figure 4A:
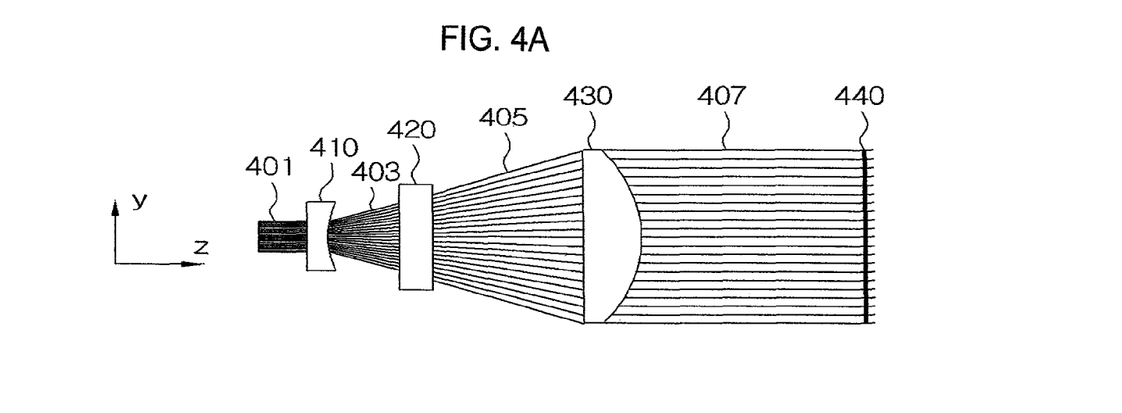
FIGS. 4A and 4B illustrate a line illumination method of a line beam illumination optical system in accordance with an embodiment of the present invention.
Figure 4B:
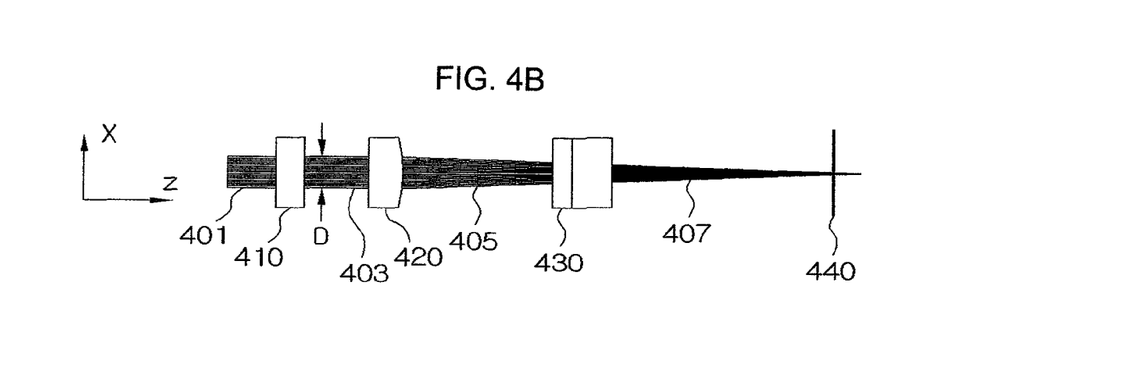

FIGS. 4A and 4B illustrate a line illumination method of a line beam illumination optical system in accordance with an embodiment of the present invention. Referring to FIGS. 4A and 4B, an incident beam of light 401 emitted from a light source, a diffused beam of light 403, a converged beam of light 405, a parallel beam of light 407, a first lens 410, a second lens 420, a third lens 430 and a converged point 440 are illustrated.

The incident beam of light 401 emitted from the light source can pass through the first lens 410 (e.g. a concave lens) and then can be diffused in a first direction (e.g. y-direction) before being incident to the second lens 420 (e.g. a cylinder lens).

The diffused beam of light 403 can be converted to the beam of light 405 converged in a second direction (e.g. x-direction) vertically with the first direction. Here, the terms of "vertically" can indicate the mutual relationship of exactly or approximately 90 degrees between two things. In other words, the first direction and the second direction can be discretionarily selected to finally generate the line beam.

As a result, the converged beam of light 405 can be converted to the parallel beam of light 407 in parallel with the first direction by being incident to the third lens 430 (e.g. a cylinder lens) before being collimated in the first direction. Here, the phase of "the parallel beam of light 407 in parallel with the first direction" can indicate that the distance between the parallel beam 407 and the first direction is toughly regular. Accordingly, the parallel beam 407 can be in parallel with the first direction and can be converged in the second direction. The parallel beam 407 reaching to the converged point 430 can be converted to a line beam. The forgoing optical modulator can be placed at the converged point 430.

Here, if the distance between the second lens 420 and the converged point 440 is assumed to be I and the distance between the first lens 410 and the third lens 430 is assumed to be K, the following formula (1) can be satisfied for the overall length L of the illumination optical system.

$$I \leq L \leq I+K \quad (1)$$

This shows that the present invention has the shorter overall length L of the illumination optical system than the conventional art.

Also, if the incident beam of light 401 emitted from the light source is assumed to have the width D, the illumination-conversion angle $NA_x$ of the second lens 420 can be represented as the following formula (2).

$$NA_x = \frac{D}{2I} \quad (2)$$

Referring to the formula (2), the illumination-conversion angle $NA_x$ of the second lens 420 can be determined by adjusting the width D of the incident beam of light 401 emitted from the light source and the distance between the second lens 420 and the converged point 430. Here, the size of the line beam illumination optical system can be adjusted depending on the distance I. For example, if the width D of the incident beam of light 401 emitted from the light source is determined, the illumination-conversion angle $NA_x$ of the second lens 420 can be adjusted in order to realize the desired distance I.

Figure 5A:
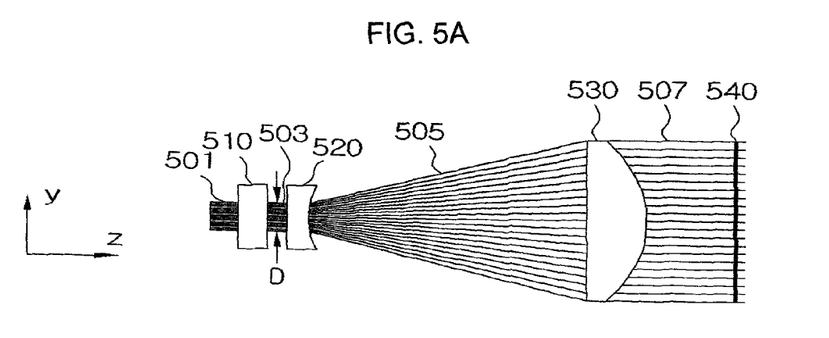
FIGS. 5A and 5B illustrate a line illumination method of a line beam illumination optical system in accordance with another embodiment of the present invention.
Figure 5B:
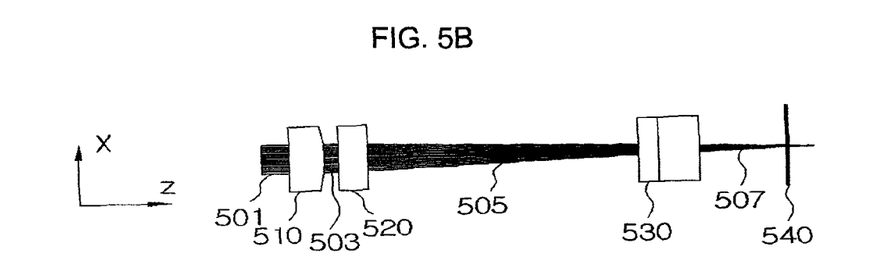

FIGS. 5A and 5B illustrate a line illumination method of a line beam illumination optical system in accordance with another embodiment of the present invention. Referring to FIGS. 5A and 5B, an incident beam of light 501 emitted from a light source, a converged beam of light 503, a diffused beam of light 505, a parallel beam of light 507, a first lens 520, a second lens 510, a third lens 530 and a converged point 540 are illustrated. The below description is related to the difference from the description of FIGS. 4A and 4B.

As compared with the description of FIGS. 4A and 4B, the difference is that the first lens and the second lens exchange their positions. In other words, the converged beam 503 converged in the second direction can be firstly emitted. Then, the converged beam 503 can be converted to the diffused beam 505 by passing through the first lens 520 and then can be converted to the parallel beam 507 by passing through the third lens 530.

Here, the overall length L of the illumination optical system is as follows.

$$L = I \quad (3)$$

Here, the distance I refers to the distance between the second lens 510 and the converged point 540. The embodiment of FIGS. 5A and 5B has the shorter overall length of the illumination optical system than that of FIGS. 4A and 4B.

The present invention is not limited to the foregoing embodiments and any person of ordinary skill in the art shall understand that a large number of permutations and other equivalent embodiments are possible.

Hitherto, although some embodiments of the present invention have been shown and described for the above-described objects, it will be appreciated by any person of ordinary skill in the art that a large number of modifications, permutations and additions are possible within the principles and spirit of the invention, the scope of which shall be defined by the appended claims and their equivalents.

What is claimed is:

1. A line beam illumination optical system, comprising:
a first lens, configured to emit a beam of light incident from a light source in a first direction;
a second lens, configured to converge the beam of light, emitted in the first direction, in a second direction that is vertical to the first direction; and
a third lens, configured to form a line beam in parallel with respect to the first direction by collimating the beam of light, converged in the second direction, in the first direction,
wherein an illumination-conversion angle of the second lens is determined by the following formula, $$NA_x = \frac{D}{2I}$$

whereas, $NA_x$ refers to the illumination-conversion angle, D refers to a second-directional width of the beam of light incident from the light source, I refers to a distance between the second lens and a converged point of the second direction.

2. A line beam illumination optical system, comprising:
a second lens, configured to converge a beam of light incident from a light source in a second direction;
a first lens, configured to emit the beam of light, converged in the second direction, in a first direction that is vertical to the second direction; and
a third lens, configured to form a line beam in parallel with respect to the first direction by collimating the beam of light emitted in the first direction,
wherein an illumination-conversion angle of the second lens is determined by the following formula, $$NA_x = \frac{D}{2I}$$

whereas, $NA_x$ refers to the illumination-conversion angle, D refers to a second-directional width of the beam of light incident from the light source, I refers to a distance between the second lens and a converged point of the second direction.

* * * * *